United States Patent
Nishijima et al.

(10) Patent No.: US 9,903,597 B2
(45) Date of Patent: Feb. 27, 2018

(54) COOKING DEVICE INCLUDING BUFFER CHAMBER

(75) Inventors: Masahiro Nishijima, Osaka (JP); Takashi Utsumi, Osaka (JP); Takahiro Fukunaga, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 317 days.

(21) Appl. No.: 13/642,795

(22) PCT Filed: Apr. 27, 2011

(86) PCT No.: PCT/JP2011/060221
§ 371 (c)(1),
(2), (4) Date: Oct. 22, 2012

(87) PCT Pub. No.: WO2011/136252
PCT Pub. Date: Nov. 3, 2011

(65) Prior Publication Data
US 2013/0042768 A1    Feb. 21, 2013

(30) Foreign Application Priority Data

Apr. 28, 2010  (JP) .................................. 2010-103613
Apr. 28, 2010  (JP) .................................. 2010-103614
(Continued)

(51) Int. Cl.
*A47J 27/04*       (2006.01)
*F24C 15/32*       (2006.01)
(Continued)

(52) U.S. Cl.
CPC .............. *F24C 15/327* (2013.01); *A21B 3/04* (2013.01); *F01K 23/00* (2013.01); *F22B 1/285* (2013.01)

(58) Field of Classification Search
CPC ... A47J 27/62; A47J 2027/043; F24C 15/327; F24C 15/325; F24C 15/18; A23L 1/0121; A21B 3/04; F22B 1/285; F01K 23/00
(Continued)

(56) References Cited

U.S. PATENT DOCUMENTS 2,147,024 A * 2/1939 Frisk .............................. 99/468
3,052,615 A * 9/1962 Johns et al. .................. 376/408
(Continued)

FOREIGN PATENT DOCUMENTS

CN          2810427 Y       7/2008
EP          1 541 025 A1    6/2005
(Continued)

*Primary Examiner* — Eric Stapleton
(74) *Attorney, Agent, or Firm* — Birch, Stewart, Kolasch & Birch, LLP

(57) ABSTRACT

A steam generating container A heated by a heat source includes: a water evaporation chamber into which water is supplied by a water supply device; a leading opening to lead steam from the water evaporation chamber, and ejection openings ejecting steam led through the leading opening into a heating chamber containing food. A buffer chamber connecting through the leading opening and with the ejection openings is provided between the water evaporation chamber and the heating chamber. Even when bumping water enters the buffer chamber through the leading opening, the bumping water having entered flows inside the buffer chamber. Thus, the bumping water is hardly ejected into the heating chamber through the ejection openings.

6 Claims, 15 Drawing Sheets

(30) Foreign Application Priority Data

| Apr. 28, 2010 | (JP) | 2010-103615 |
|---|---|---|
| Apr. 28, 2010 | (JP) | 2010-103616 |
| Aug. 18, 2010 | (JP) | 2010-183335 |

(51) Int. Cl.
*A21B 3/04* (2006.01)
*F22B 1/28* (2006.01)
*F01K 23/00* (2006.01)

(58) Field of Classification Search
USPC ......... 99/325, 331, 400, 401, 410, 411, 451, 99/468; 219/401, 405, 467, 474, 219/484–486, 121.6, 121.68, 219/121.74–121.8; 126/20, 21 A, 369; 392/402; 359/223.1, 224.1, 850, 904
See application file for complete search history.

(56) References Cited

U.S. PATENT DOCUMENTS

| 3,304,149 | A | * | 2/1967 | Pile | 422/114 |
|---|---|---|---|---|---|
| 3,406,665 | A | * | 10/1968 | Bukau | 122/31.1 |
| 3,520,640 | A | * | 7/1970 | Bell et al. | 417/360 |
| 3,809,374 | A | * | 5/1974 | Schossow | 261/130 |
| 3,854,468 | A | * | 12/1974 | Nozaki | 126/113 |
| 3,873,806 | A | * | 3/1975 | Schossow | 392/402 |
| 3,943,842 | A | * | 3/1976 | Bills et al. | 99/473 |
| 3,950,137 | A | * | 4/1976 | Larson et al. | 422/81 |
| 3,999,475 | A | * | 12/1976 | Roderick | 99/474 |
| 4,110,916 | A | * | 9/1978 | Bemrose | 34/197 |
| 4,146,057 | A | * | 3/1979 | Friedman et al. | 60/648 |
| 4,165,620 | A | * | 8/1979 | Gehauf nee Kiesel et al. | 62/256 |
| 4,244,979 | A | * | 1/1981 | Roderick | 426/418 |
| 4,287,407 | A | * | 9/1981 | Treiber et al. | 392/400 |
| 4,377,737 | A | * | 3/1983 | Berry | 392/401 |
| 4,483,243 | A | * | 11/1984 | Cote | 99/468 |
| 4,546,726 | A | * | 10/1985 | Nagasaka et al. | 118/719 |
| 4,674,402 | A | * | 6/1987 | Raufeisen | 99/468 |
| 4,920,251 | A | * | 4/1990 | Whitenack et al. | 219/401 |
| 5,027,750 | A | * | 7/1991 | Boland et al. | 122/31.1 |
| 5,063,609 | A | * | 11/1991 | Lorimer | 392/401 |
| 5,072,666 | A | * | 12/1991 | Hullstrung | 99/468 |
| 5,097,753 | A | * | 3/1992 | Naft | 99/341 |
| 5,103,076 | A | * | 4/1992 | Houkuwa | 219/401 |
| 5,455,005 | A | * | 10/1995 | Clawson et al. | 422/1 |
| 5,532,456 | A | * | 7/1996 | Smith et al. | 219/400 |
| 5,558,010 | A | * | 9/1996 | Shelton | 99/468 |
| 5,595,109 | A | * | 1/1997 | Shelton | 99/476 |
| 5,649,476 | A | * | 7/1997 | Montagnino et al. | 99/415 |
| 5,802,963 | A | * | 9/1998 | Cohn et al. | 99/476 |
| 5,992,301 | A | * | 11/1999 | Mukumoto | 99/330 |
| 6,040,564 | A | * | 3/2000 | Ueda et al. | 219/682 |
| 6,098,527 | A | * | 8/2000 | Chang | 99/330 |
| 6,107,605 | A | * | 8/2000 | Creamer et al. | 219/401 |
| 6,133,558 | A | * | 10/2000 | Ueda et al. | 219/682 |
| 6,157,006 | A | * | 12/2000 | Sickles et al. | 219/401 |
| 6,267,046 | B1 | * | 7/2001 | Wanat | 99/332 |
| 6,323,464 | B1 | * | 11/2001 | Cohn | 219/401 |
| 6,474,222 | B1 | * | 11/2002 | Pretre | 99/331 |
| 6,592,364 | B2 | * | 7/2003 | Zapata et al. | 432/145 |
| 6,639,185 | B1 | * | 10/2003 | McConnell et al. | 219/386 |
| 6,641,625 | B1 | * | 11/2003 | Clawson et al. | 48/127.9 |
| 6,656,423 | B1 | * | 12/2003 | Joslyn | 422/1 |
| 6,796,223 | B2 | * | 9/2004 | Jiang | 99/468 |
| 6,886,452 | B2 | * | 5/2005 | Schuh | 99/327 |
| 6,903,307 | B1 | * | 6/2005 | McConnell et al. | 219/401 |
| 6,906,291 | B2 | * | 6/2005 | Shozo | 219/401 |
| 6,909,071 | B2 | * | 6/2005 | Shozo | 219/401 |
| 7,192,272 | B2 | * | 3/2007 | Jones et al. | 432/200 |
| 7,208,702 | B2 | * | 4/2007 | Choi | 219/401 |
| 7,220,946 | B2 | * | 5/2007 | Majchrzak et al. | 219/401 |
| 7,241,976 | B2 | * | 7/2007 | Andoh et al. | 219/401 |
| 7,326,893 | B2 | * | 2/2008 | Kanzaki et al. | 219/682 |
| 7,353,821 | B2 | * | 4/2008 | Saksena | 126/369 |
| RE40,408 | E | * | 7/2008 | McConnell et al. | 219/386 |
| 7,418,960 | B2 | * | 9/2008 | Saksena | 126/369 |
| 7,509,034 | B2 | * | 3/2009 | Kadoma et al. | 392/386 |
| 7,759,615 | B2 | * | 7/2010 | Ando et al. | 219/401 |
| 7,847,220 | B2 | * | 12/2010 | Jeon et al. | 219/401 |
| 7,856,875 | B2 | * | 12/2010 | Jeon et al. | 73/290 R |
| 7,967,002 | B2 | * | 6/2011 | Inada et al. | 126/21 A |
| 8,044,326 | B2 | * | 10/2011 | Ando et al. | 219/401 |
| 8,134,101 | B2 | * | 3/2012 | Majchrzak | 219/400 |
| 8,161,870 | B2 | * | 4/2012 | Yamamoto et al. | 99/330 |
| 8,256,409 | B2 | * | 9/2012 | Matsubayashi et al. | 126/21 A |
| 8,505,575 | B2 | * | 8/2013 | Chen et al. | 137/565.17 |
| 8,648,281 | B2 | * | 2/2014 | Utsumi et al. | 219/401 |
| 2001/0032403 | A1 | * | 10/2001 | Har et al. | 38/77.7 |
| 2002/0178932 | A1 | * | 12/2002 | Cai | 99/516 |
| 2003/0101875 | A1 | * | 6/2003 | Ono | 99/339 |
| 2003/0159593 | A1 | * | 8/2003 | Leutwyler | 99/348 |
| 2004/0172877 | A1 | * | 9/2004 | Wunning | 48/102 A |
| 2005/0051530 | A1 | * | 3/2005 | Shozo | 219/401 |
| 2005/0252250 | A1 | * | 11/2005 | Oh et al. | 68/12.03 |
| 2006/0093713 | A1 | * | 5/2006 | Jurkovich et al. | 426/511 |
| 2006/0225726 | A1 | * | 10/2006 | Andoh et al. | 126/20 |
| 2006/0291828 | A1 | * | 12/2006 | Kadoma et al. | 392/404 |
| 2007/0006864 | A1 | * | 1/2007 | Kobayashi | 126/20 |
| 2007/0187388 | A1 | * | 8/2007 | Yamaguchi et al. | 219/401 |
| 2007/0187389 | A1 | * | 8/2007 | Chiang | 219/401 |
| 2007/0210058 | A1 | * | 9/2007 | Ando et al. | 219/401 |
| 2007/0210059 | A1 | * | 9/2007 | Ando et al. | 219/401 |
| 2007/0227560 | A1 | * | 10/2007 | Doherty et al. | 134/25.2 |
| 2008/0245394 | A1 | * | 10/2008 | Doherty et al. | 134/21 |
| 2009/0007798 | A1 | * | 1/2009 | Yamaguchi et al. | 99/330 |
| 2009/0071382 | A1 | * | 3/2009 | Clarke et al. | 110/346 |
| 2009/0106914 | A1 | * | 4/2009 | Bringewatt et al. | 8/159 |
| 2009/0272729 | A1 | * | 11/2009 | Ando et al. | 219/401 |
| 2011/0095013 | A1 | * | 4/2011 | Utsumi et al. | 219/401 |

FOREIGN PATENT DOCUMENTS

| JP | 61-10401 U | 1/1986 |
|---|---|---|
| JP | 64-51106 U | 3/1989 |
| JP | 8-135978 A | 5/1998 |
| JP | 2001-336792 A | 12/2001 |
| JP | 2004-37076 A | 2/2004 |
| JP | 2004-248900 A | 9/2004 |
| JP | 2005-83708 A | 3/2005 |
| JP | 2005-147604 A | 6/2005 |
| JP | 2005-287890 A | 10/2005 |
| JP | 2006-37076 A | 2/2006 |
| JP | 2006-58003 A | 3/2006 |
| JP | 2006-84059 A | 3/2006 |
| JP | 2006-317103 A | 11/2006 |
| JP | 2006-349313 A | 12/2006 |
| JP | 2008-32304 A | 2/2008 |
| JP | 2008-164284 A | 7/2008 |
| JP | 2008-206957 A | 9/2008 |
| JP | 2009-22790 A | 2/2009 |
| JP | 2010-7930 A | 1/2010 |
| JP | 2010-159920 A | 7/2010 |
| WO | WO 2008/082070 A1 | 7/2008 |

* cited by examiner

COOKING DEVICE INCLUDING BUFFER CHAMBER

CROSS-REFERENCE TO RELATED APPLICATIONS

This application is the national phase under 35 U.S.C. § 371 of PCT International Application No. PCT/JP2011/060221 which has International filing date of Apr. 27, 2011 and designated the United States of America.

FIELD

The present invention relates to a cooking device cooking food by using steam.

BACKGROUND AND SUMMARY

When food is to be cooked, in order that food having high nutritive values should be allowed to be taken in, it is preferred that cell disruption in the food during the cooking is suppressed so that outflow of the nutrients contained in the food is avoided. When food is cooked by using an oven (a cooking device), heat is conducted to the core of the food into an appropriate temperature in a high temperature atmosphere and hence outflow of the nutrients from the food is avoided.

In recent years, with increasing desire for health, cooking devices utilizing steam have been proposed in which outflow of the nutrients of food is avoided and at the same time fat is eliminated (for example, see Japanese Patent Application Laid-Open No. 2006-84059). The cooking device described in the Japanese Patent Application includes: a housing provided with a heating chamber the front side of which is opened and which heats contained food; a door opening and closing the front side open part of the heating chamber; a magnetron heating the heating chamber; and a steam generating container supplying steam to the heating chamber. Then, cooking is achieved in a state that high temperature steam fills the heating chamber.

In the steam generating container, an ejection opening ejecting into the heating chamber the steam of the water evaporation chamber is provided in an upper part of the steam generating chamber (the water evaporation chamber) having a water supply port in a lower part. A baffle plate is provided between the water supply port and the ejection opening which are opened in the water evaporation chamber. When water having been supplied through the water supply port to the water evaporation chamber boils and runs up, the baffle plate prevents the boiling water from reaching the upper part so as to avoid a situation that the boiling water is ejected through the ejection opening into the heating chamber.

SUMMARY OF THE INVENTION

Problem to be Solved by the Invention

Nevertheless, in cooking devices employing a baffle plate in the water evaporation chamber, a situation easily occurs that bumping water having boiled in the water evaporation chamber detours the baffle plate and reaches the ejection opening so that the bumping water is ejected through the ejection opening into the heating chamber. That is, the effect has been unsatisfactory that bumping water is prevented from being ejected into the heating chamber. Further, the necessity of the baffle plate in the water evaporation chamber has caused problems of complexity in the structure and of increase in the cost.

The present invention has been devised in view of such situations. A major object is to provide a cooking device in which without the necessity of an obstacle such as a baffle plate provided in a water evaporation chamber, bumping water in the water evaporation chamber is more reliably prevented from entering a heating chamber.

The cooking device according to the present invention is a cooking device comprising: a heating chamber in which food is put and heated; a heating means heating the food; a steam generating container including a water evaporation chamber; a heat source heating the steam generating container; a water supply device supplying water to the water evaporation chamber; a leading opening to lead steam from the evaporation chamber; and an ejection opening ejecting into the heating chamber the steam led from the leading opening, wherein a buffer chamber connecting through the leading opening and the ejection opening is provided between the water evaporation chamber and the heating chamber.

In the present invention, a buffer chamber is located between the evaporation chamber and the heating chamber. Thus, steam is ejected through the ejection opening into the heating chamber via the buffer chamber. Accordingly, when water having been supplied to the water evaporation chamber bumps inside the water evaporation chamber and the bumping water enters the buffer chamber through the leading opening, the bumping water having entered flows inside the buffer chamber. Thus, the bumping water is hardly ejected into the heating chamber through the ejection opening. Further, the inside of the buffer chamber is allowed to be heated with heat conducted from the heating chamber. This raises the temperature of the steam flowing in the buffer chamber and hence improves the heating efficiency. As a result, size reduction is achieved in the heat source heating the steam generating container. Accordingly, size reduction is achieved in the cooking device and hence cost reduction is achieved. Further, the unnecessity of a baffle plate or the like in the evaporation chamber simplifies the structure of the steam generating container, and hence achieves cost reduction.

The cooking device according to the present invention is characterized in that the buffer chamber is located adjacent to the heating chamber.

In the present invention, the buffer chamber is located adjacent to the heating chamber. Thus, heat of the heating chamber is conducted to the buffer chamber. Accordingly, steam generated in the water evaporation chamber is reheated in the buffer chamber. Further, the steam is ejected into the heating chamber via the buffer chamber. Thus, the pressure of the steam is adjusted.

The cooking device according to the present invention is characterized in that the buffer chamber and the evaporation chamber are adjacent to each other.

In the present invention, the buffer chamber is located adjacent to the evaporation chamber. Thus, heat of the water evaporation chamber is conducted to the buffer chamber. Thus, heat for generating steam is utilized for reheating the steam. This improves the energy efficiency.

The cooking device according to the present invention is characterized in that the buffer chamber is adjacent to both the water evaporation chamber and the heating chamber.

In the present invention, the buffer chamber is adjacent to both the water evaporation chamber and the heating chamber. Thus, heat of the water evaporation chamber and the heating chamber is conducted to the buffer chamber. Accordingly, the heat of both chambers is utilized for reheating the steam and hence the energy efficiency is improved remarkably. Further, since the buffer chamber is located between both chambers, a high temperature is maintained inside the buffer chamber.

The cooking device according to the present invention is characterized in that the water evaporation chamber is located adjacent to the heating chamber.

In the present invention, the water evaporation chamber is located adjacent to the heating chamber and hence heat of the heating chamber is conducted to the water evaporation chamber. Thus, heat of the heating chamber is utilized for evaporation of water and hence thermal efficiency of evaporation is improved. Accordingly, load to the heat source supplying heat to the water evaporation chamber is alleviated.

The cooking device according to the present invention is characterized in that the heat source is located between the buffer chamber and the evaporation chamber.

In the present invention, the heat source is located between the buffer chamber and the water evaporation chamber. Thus, heat of the heat source is supplied to both chambers. This improves thermal efficiencies of evaporation and of steam reheating. Further, size reduction of the water evaporation chamber is promoted.

The cooking device according to the present invention is characterized in that a plurality of heat sources are vertically aligned in a wall of the buffer chamber.

In the present invention, in the wall of the buffer chamber, a plurality of heat sources are vertically aligned. Thus, the steam of the buffer chamber that flows in a direction intersecting the vertical direction is heated for a long time and hence brought into a high temperature.

The cooking device according to the present invention is characterized in that the leading opening is provided in a wall of the buffer chamber and that the leading opening and the ejection opening are separated from each other in a direction intersecting the direction of steam ejection.

In the present invention, in comparison with a case that the leading opening and the ejection opening are located opposite to each other in the direction of ejection, the flow path of the steam flowing from the leading opening to the ejection opening is longer. Thus, in the course of flowing through the buffer chamber, the steam is satisfactorily heated with the heat of the heating chamber. Further, the steam is prevented from travelling straight from the leading opening to the ejection opening.

The cooking device according to the present invention is characterized in that the ejection opening is located lower than the delivery opening.

In the present invention, after the steam supplied through the leading opening located on the upper side fills the buffer chamber, the steam is ejected through the ejection opening located on the lower side. Thus, a large amount of steam is heated in the buffer chamber, and hence high temperature steam is easily supplied to the heating chamber continuously.

The cooking device according to the present invention is characterized in that a guide wall guiding the steam from the leading opening to the ejection opening is located in the buffer chamber.

In the present invention, since a guide wall is provided in the buffer chamber, the steam is guided from the leading opening to the ejection opening. When the guide wall is designed to be long, the steam flows through the buffer chamber for a long time and hence a large amount of heat is supplied to the steam from the heating chamber.

The cooking device according to the present invention is a cooking device comprising: a heating chamber in which food is put and heated; a steam generating container supplying steam to the heating chamber; and a water supply means supplying water to the steam generating container, wherein the steam generating container includes an opening, and the opening is closed by a wall of the heating chamber.

In the present invention, an opened part is brought into close contact with the wall of the heating chamber so that the wall is used as a cover and then an approximately sealed space is formed by the steam generating container and the heating chamber. Bumping water flows through the space. Thus, the bumping water is hardly ejected into the heating chamber through the ejection opening. Further, the inside of the space is allowed to be heated with heat conducted from the heating chamber. This raises the temperature of the steam flowing in the space and hence improves the heating efficiency. As a result, size reduction is achieved in the heat source heating the steam generating container. Accordingly, size reduction is achieved in the cooking device and hence fabrication cost reduction is achieved. Further, the unnecessity of a baffle plate or the like in the water evaporation chamber simplifies the structure of the steam generating container, and hence achieves fabrication cost reduction. Further, a cover having been necessary for forming a sealed space in the prior art is allowed to be omitted.

The cooking device according to the present invention is characterized in that the steam generating container includes a buffer chamber located adjacent to the wall of the heating chamber and storing the steam, that the buffer chamber includes: a wall located opposite to the wall of the heating chamber; and an annular wall protruding from the wall toward the wall of the heating chamber, in which a sealing member preventing leakage of the steam is provided along the entire circumference of a protruding end of the annular wall, and that the sealing member is in contact with the wall of the heating chamber, steam is ejected from the buffer chamber to the heating chamber, and inside of the annular wall is the opening.

In the present invention, a sealing member is provided along the entire circumference of the annular wall constituting the buffer chamber storing steam, and then the buffer chamber is located immediately adjacent to the heating chamber via the sealing member. At the time of fabricating the steam generating container, the buffer chamber forms an opened space. Thus, load to the design of a metal mold used for molding the steam generator is minimized. Further, when the steam generating container is attached to the heating chamber, the sealing member avoids leakage of the steam from the buffer chamber and hence heat of the heating chamber is efficiently conducted to the steam stored in the buffer chamber.

The cooking device according to the present invention is characterized in that the sealing member includes a close contact part protruding toward an inner side of the annular wall and located in close contact with the wall of the heating chamber.

In the present invention, the close contact part is brought into close contact with the gap between the sealing member and the heating chamber by virtue of the steam pressure of the buffer chamber, and is pressed against the heating chamber by virtue of the steam pressure.

In the cooking device according to the present invention, when water having been supplied to the water evaporation chamber bumps inside the evaporation chamber and then the bumping water enters the buffer chamber or the space through the leading opening, the bumping water having entered flows inside the buffer chamber or the space. Thus, the bumping water is more hardly ejected into the heating chamber through the ejection opening. Further, the heat conducted from the heating chamber raises the temperature of the steam in the buffer chamber, and hence raises the heating efficiency. Further, the unnecessity of a baffle plate or the like in the evaporation chamber simplifies the structure of the steam generating container, and hence achieves fabrication cost reduction.

DETAILED DESCRIPTION OF NON-LIMITING EXAMPLE EMBODIMENTS

Embodiment 1

Figure 1:
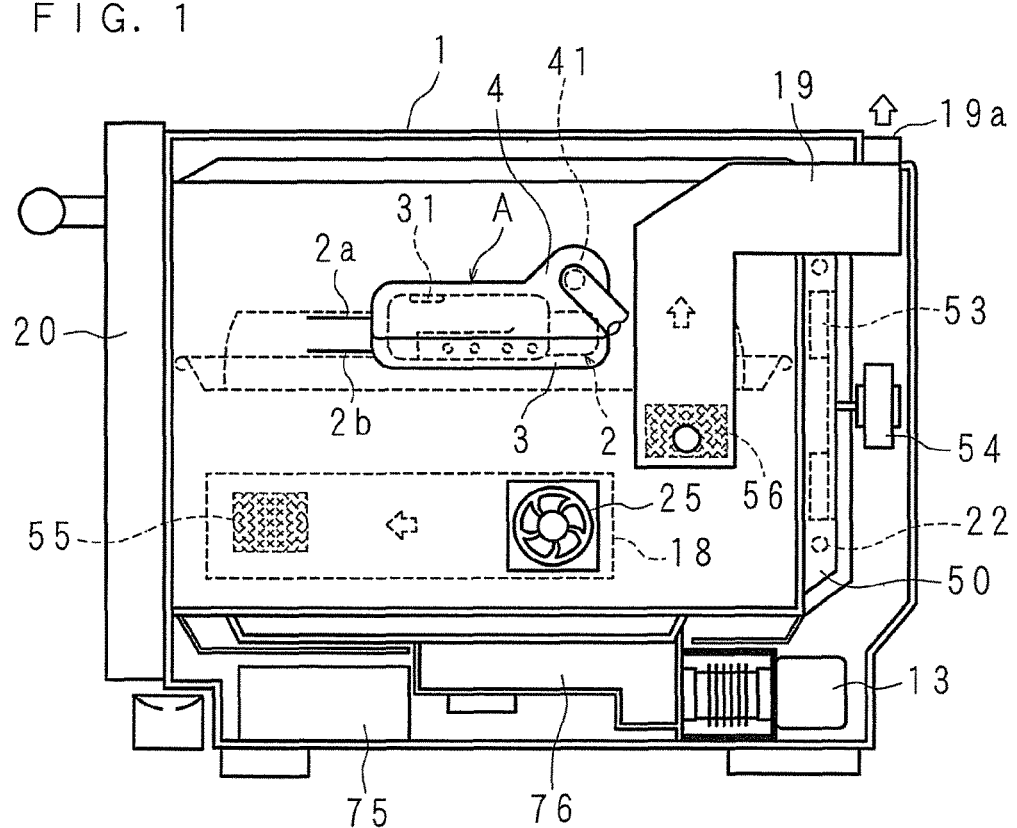
FIG. 1 is a right side sectional view schematically illustrating a cooking device according to Embodiment 1.
Figure 2:
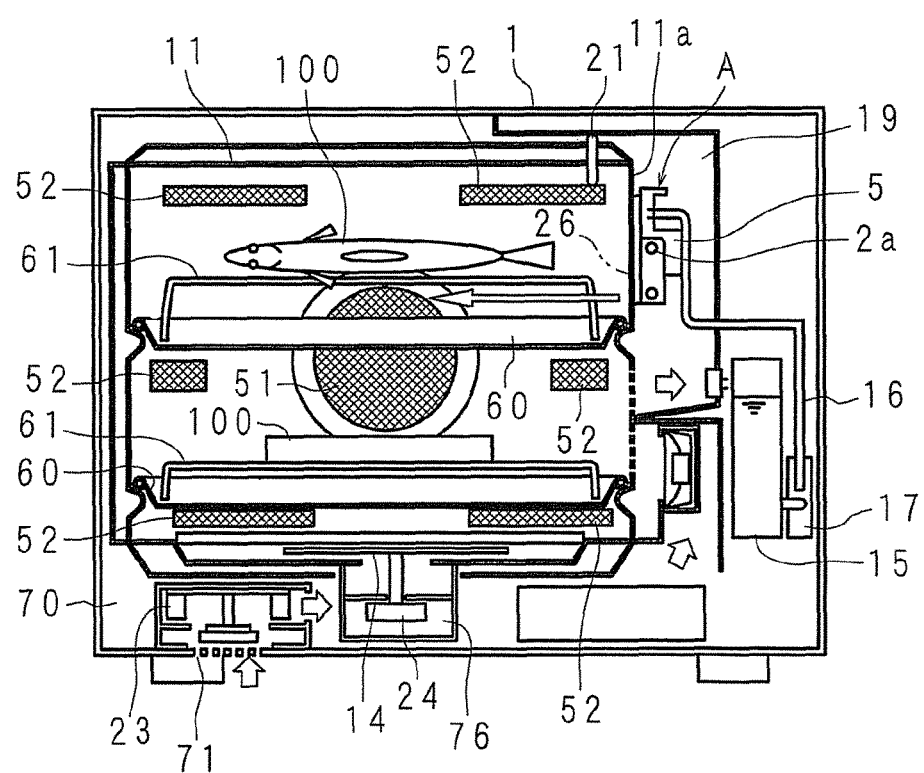
FIG. 2 is a front sectional view schematically illustrating a cooking device.

The following description of the present invention is given in detail with reference to drawings illustrating a cooking device according to Embodiment 1. FIG. 1 is a right side sectional view schematically illustrating a cooking device. FIG. 2 is a front sectional view schematically illustrating the cooking device.

In these FIGS., numeral 1 indicates a housing having a rectangular parallelepiped shape. The housing 1 contains a heating chamber 11 for heating food. In the heating chamber 11, two trays (saucers) 60 and 60 are contained and aligned up and down. Then, a placement grid 61 is provided on each tray 60, and food 100 is placed on the placement grid 61.

Between the housing 1 and the heating chamber 11, an outside air inflow duct 70 is formed on the lower side and the right side relative to the heating chamber 11. An inlet port 71 is provided in a lower part of the housing 1, and the outside air inflow duct 70 is connected to the inlet port 71. An opening (not illustrated) is provided in a rear face part of the housing 1, and the outside air inflow duct 70 is connected to the opening.

In the inside of the outside air inflow duct 70, arranged are a cooling fan 23, an electric equipment part 75, and a magnetron 13. The cooling fan 23 takes in outside air through the inlet port 71 into the outside air inflow duct 70, and then cools the electric equipment part 75 and the magnetron 13 which generate heat. The air taken into the outside air inflow duct 70 is exhausted through the opening.

The electric equipment part 75 includes: drive circuits driving individual parts of the cooking device; and a control part controlling the drive circuits. In a microwave heating mode in which food is heated with microwaves, the control part performs necessary heating control in response to input signals from an operation part (not illustrated). The magnetron 13 generates electromagnetic waves for cooking and supplies the microwaves to the heating chamber 11 through a waveguide 76. In the waveguide 76, provided are a rotating antenna 14 and a motor 24 driving the rotating antenna 14. Then, the rotating antenna 14 supplies the microwaves uniformly to the heating chamber 11.

In the inside of the outside air inflow duct 70, an air intake duct 18 is provided on the right side of the heating chamber 11. An opening is provided in the right side face part of the housing 1. Then, the air intake duct 18 is connected to the opening. An air intake fan 25 is provided in the opening. An air inlet port 55 is provided in the right side face part 11a of the heating chamber 11. Then, the air inlet port 55 is connected to the air intake duct 18. When the air intake fan 25 is driven, outside air is taken into the air intake duct 18 and then supplied through the air inlet port 55 to the heating chamber 11.

An exhaust duct 19 is provided in a rear right side face part of the heating chamber 11. The exhaust duct 19 extends upward, and an exhaust port 19a is provided in the extension end part. In the rear part of the right side face part 11a of the heating chamber 11, an intake port 56 is provided for taking in the air in the heating chamber 11. Then, the intake port 56 is connected to the exhaust duct 19. The air in the heating chamber 11 is taken into the exhaust duct 19 through the intake port 56, and then exhausted to the outside through the exhaust port 19a.

An inlet port 51 is provided in the center part of the rear face part of the heating chamber 11. In the rear face part of the heating chamber 11, a plurality of ejection ports 52 are provided around the inlet port 51. A circulation duct 50 is provided on the rear side of the heating chamber 11, and the circulation duct 50 is connected to the inlet port 51 and the ejection ports 52. In the inside of the circulation duct 50, a circulation heater 22 and a circulating fan 53 are provided. The circulating fan 53 is linked to a fan motor 54. When the fan motor 54 is driven, air in the heating chamber 11 is suctioned through the inlet port 51, then heated by the circulation heater 22, and then returned through the ejection ports 52 to the heating chamber 11.

A temperature sensor 21 detecting the temperature in the heating chamber 11 is provided in the top face of the heating chamber 11. The circulation heater 22 is controlled on the basis of the temperature detected by the temperature sensor 21, and thereby maintains at a desired temperature the steam supplied to the heating chamber 11 from the steam generator A described later.

In the upper center part of the right side face part 11a of the heating chamber 11, a plurality of ejection openings 26, 26, . . . , 26 are vertically aligned in two rows. At a position opposite to the ejection openings 26, the steam generator A is fixed on the outer side of the right side face part 11a. The steam generated by the steam generator A is ejected through the ejection openings 26 arranged up and down in two rows. The steam ejected through the upper ejection openings 26 is mainly brought into contact with the food placed on the upper tray 60, and the steam ejected from the lower ejection openings 26 is mainly brought into contact with the food placed on the lower tray 60.

A water supply tank 15 which is arbitrarily attachable and detachable is arranged on the right side of the steam generator A. The water supply tank 15 is connected to a water supply pipe 16 through a water supply pump 17. The water supply pipe 16 is connected to the steam generator A. When the water supply pump 17 is driven, water is supplied from the water supply tank 15 to the steam generator A.

The steam generator A includes a heater 2 having a U-shape which is elongated forward and backward and the front part of which is curved in a semicircular shape. In the steam generator A, the water supplied from the water supply tank 15 is evaporated by the heater 2. The generated steam is supplied to the heating chamber 11 through the ejection openings 26 and thereby achieves cooking of the food 100.

Figure 3:
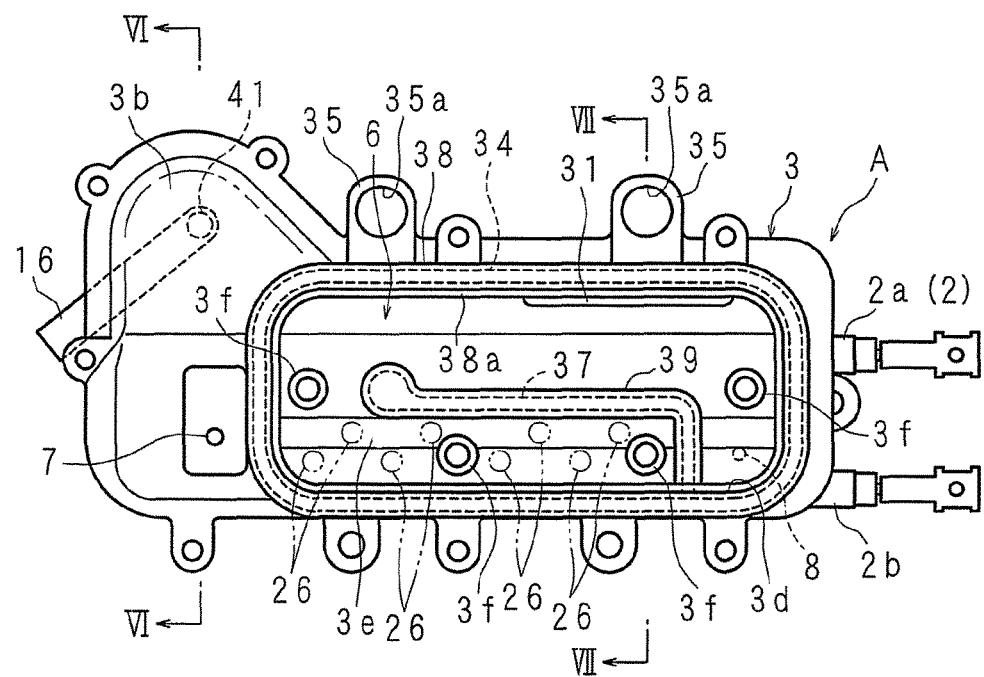
FIG. 3 is a front view illustrating a configuration of a steam generator.
Figure 4:
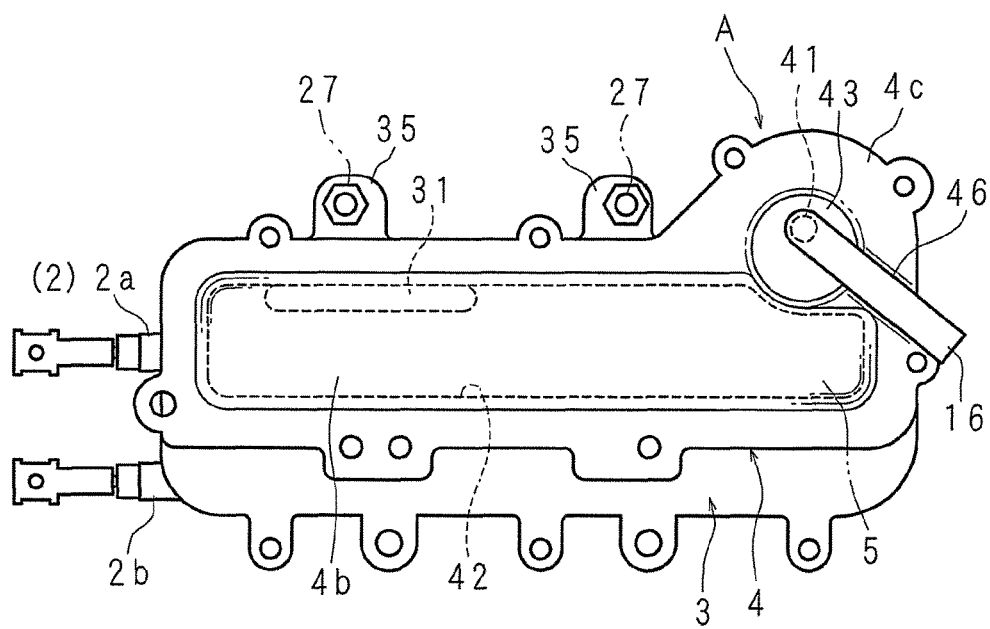
FIG. 4 is a rear view illustrating a configuration of a steam generator.
Figure 5:
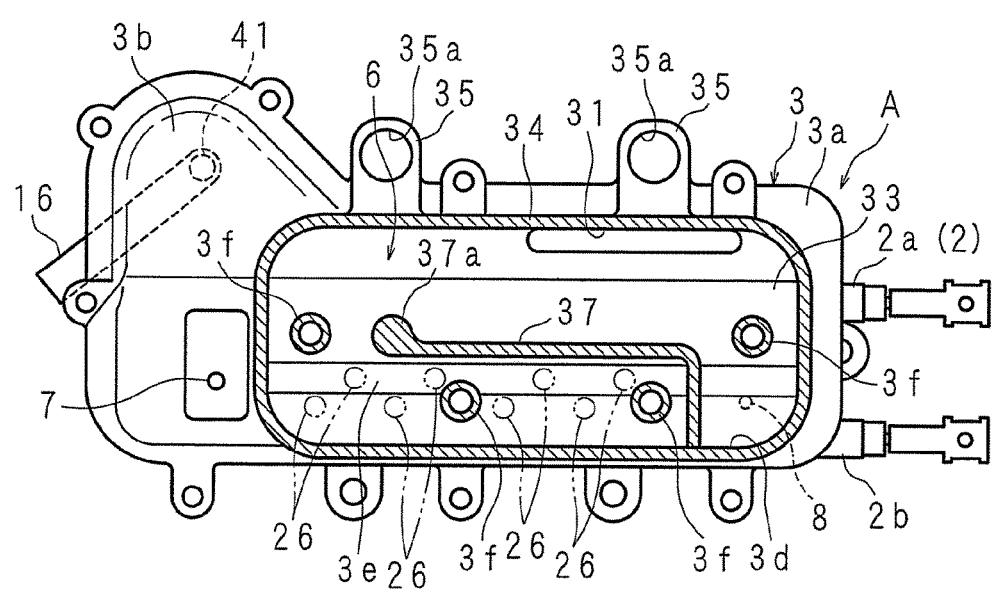
FIG. 5 is a vertical-sectional front view illustrating a configuration of a steam generator.
Figure 6:
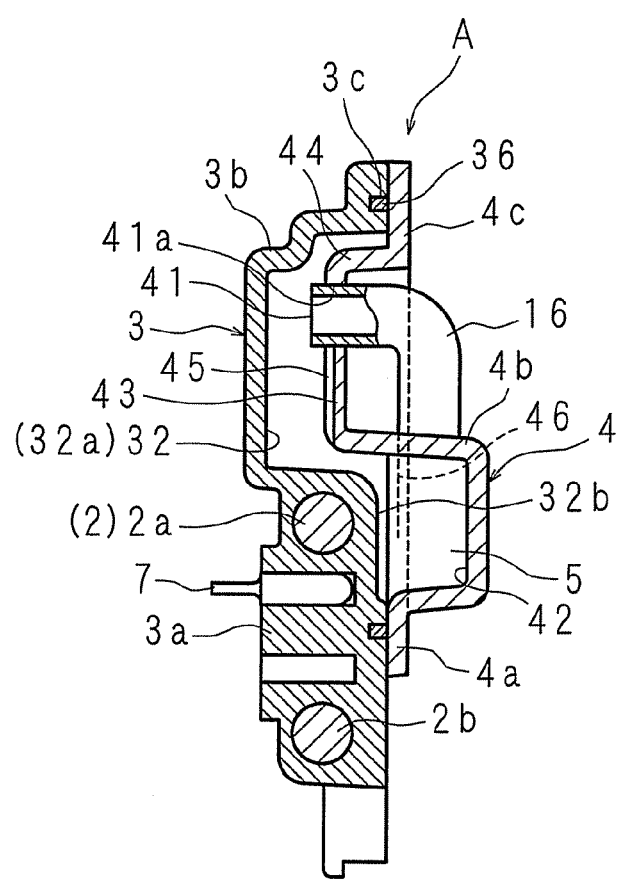
FIG. 6 is a sectional view taken along line VI-VI in FIG. 3.
Figure 7:
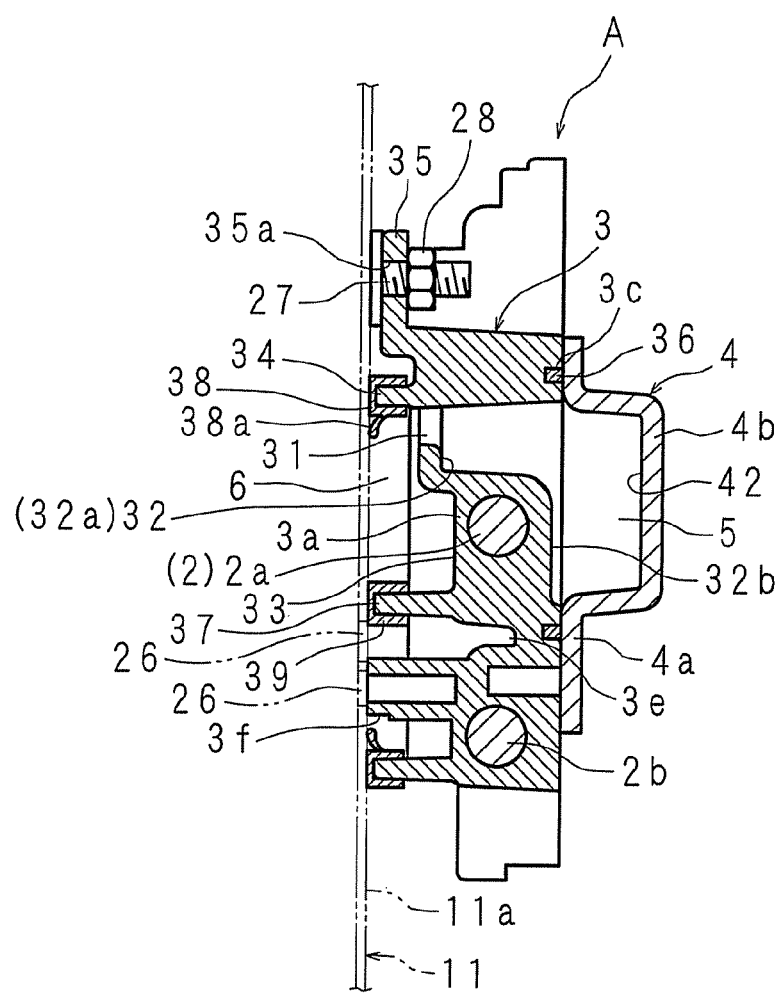
FIG. 7 is a sectional view taken along line VII-VII in FIG. 3.
Figure 8:
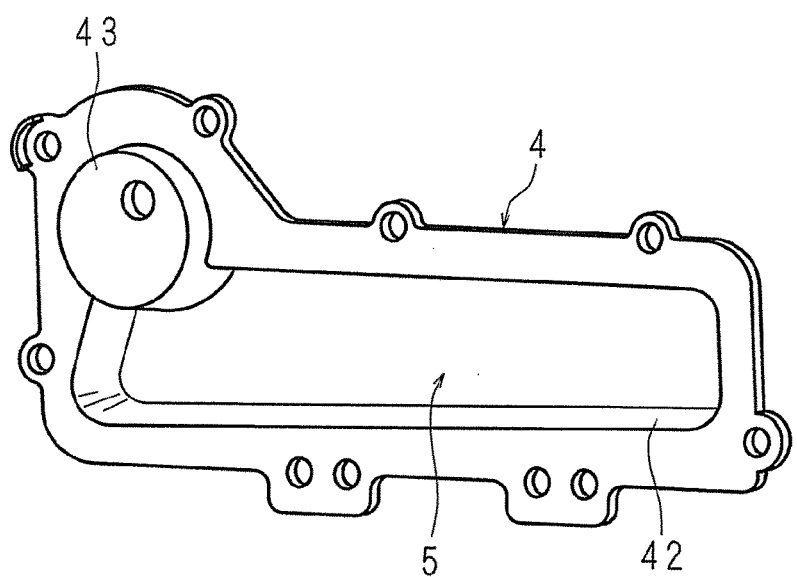
FIG. 8 is an inner side perspective view illustrating a configuration of a lid.

FIG. 3 is a front view illustrating the configuration of a steam generator. FIG. 4 is a rear view illustrating the configuration of the steam generator. FIG. 5 is a vertical-sectional front view illustrating the configuration of the steam generator. FIG. 6 is a sectional view taken along line VI-VI in FIG. 3. FIG. 7 is a sectional view taken along line VII-VII in FIG. 3. FIG. 8 is an inner side perspective view illustrating the configuration of a lid.

As illustrated in FIGS. 3 and 4, the steam generator A includes a plate-shaped water heating body 3 and a horizontally elongated lid 4. The water heating body 3 has a leading opening 31 and a heater 2. The lid 4 has a water supply port 41 connected to the water supply pipe 16. The lid 4 is attached to one face side of the water heating body 3.

The water heating body 3 is fabricated from a metallic material such as aluminum and aluminum alloy having a high thermal conductivity. The water heating body 3 includes a plate part 3a having an approximately rectangular shape in front view and elongated in a horizontal direction. A horizontally elongated first recess 32 is provided in an upper part of one face of the plate part 3a. Further, as illustrated in FIG. 5, the other face of the plate part 3a is provided with a horizontally elongated second recess 33 and with an annular wall 34 protruding from the outer periphery of the second recess 33.

As illustrated in FIG. 6, the lid 4 is located opposite to the first recess 32. Then, the lid 4 and the first recess 32 forms a horizontally elongated water evaporation chamber 5. On the other hand, as illustrated in FIGS. 5 and 7, in the other face of the plate part 3a, a horizontally elongated buffer chamber 6 is formed by the other face of the plate part 3a including the second recess 33 and the annular wall 34. The buffer chamber 6 is adjacent to the water evaporation chamber 5 via the plate part 3a, and hence the heat of the water evaporation chamber 5 is conducted to the buffer chamber 6.

In the plate part 3a, the heater 2 is buried in the forward and backward directions of the heating chamber 11. The heater 2 includes a heat source 2a located on the upper side and a heat source 2b located on the lower side. The heat source 2a and the heat source 2b are aligned in the vertical direction with each other. The heat source 2a is close to the water evaporation chamber 5, and the heat source 2b is separated downward from the water evaporation chamber 5.

Further, the heat source 2a and the heat source 2b are located close to the buffer chamber 6. That is, the heat source 2a is used mainly for evaporating water, and the heat source 2b is used mainly for heating the steam.

The heat source 2b is located in the vicinity of the ejection openings 26. Thus, the temperature of the steam is raised in the vicinity of the ejection openings 26. Then, the steam heated into a high temperature is immediately supplied to the heating chamber 11. Further, since the heat source 2b is located at a position distant from the water evaporation chamber 5, the heat of the heat source 2b is conducted mainly to the buffer chamber 6 and hence the temperature of the buffer chamber 6 rises rapidly.

The heater 2 is arranged between the buffer chamber 6 and the water evaporation chamber 5. Thus, the heat of the heater 2 is supplied to both chambers. This improves thermal efficiencies of evaporation and of steam reheating. Further, the heat source 2a and the heat source 2b are located in a plane approximately parallel to the plate part 3a. Thus, thickness reduction and size reduction of the steam generating container A are promoted, and the steam generating container A is easily arranged in a narrow space between the housing 1 and the heating chamber 11.

The delivery opening 31 is provided in an upper part of the plate part 3a. When water is supplied through the water supply port 41 to the water evaporation chamber 5, the water is evaporated in the water evaporation chamber 5 by the heat source 2a. The generated steam is ejected into the buffer chamber 6 through the leading opening 31, and then stored there.

Here, the delivery opening 31 is located above the ejection openings 26. Thus, the steam supplied through the delivery opening 31 fills the buffer chamber 6 and then is ejected through the ejection openings 26 located on the lower side. Thus, a large amount of steam is heated in the buffer chamber 6, and hence high temperature steam is supplied to the heating chamber 11 continuously.

In the plate part 3a, an extending part 3b is integrally provided that extends upward in a tapered shape from one side part of a horizontal direction of the plate part 3a and that is opposite to the water supply port 41. The first recess 32 is formed along the entirety of the extending part 3b. Here, the first recess 32 is depressed in a direction departing from the lid 4.

The U-shaped heater 2 is buried in a lower part of the plate part 3a by die-cast molding in an orientation that the heat source 2a is located up and the heat source 2b is located down. The bent part of the heater 2 is located below the extending part 3b. In an upper part of the plate part 3a, two attachment pieces 35 and 35 protruding upward are integrally provided in a manner of being separated from each other in a horizontal direction. Each attachment piece 35 has a fitting hole 35a into which an attachment shaft 27 is fit.

As illustrated in FIGS. 5 and 6, in the water heating body 3, a temperature sensor 7 is provided at a position under the extending part 3b and opposite to the bent part of the U-shaped heater 2. The temperature sensor 7 includes an element (thermistor) whose electric resistance varies in accordance with a temperature change, and is used for monitoring the temperature of the water heating body 3 so as to avoid the situations of heating an empty water evaporation chamber 5 and of insufficient temperature in the evaporation chamber 5. Further, an annular groove 3c is provided in the peripheral edge part of the one face in the plate part 3a. Then, a sealing member 36 is fit and held in the annular groove 3c so that the gap to the lid 4 is sealed.

The first recess 32 includes a deep bottom part 32a depressed over the extending part 3b and a shallow bottom part 32b continuous to the lower edge of the deep bottom part 32a via a curve corner. The heat source 2a for evaporation is located at a position opposite to the lower face of the deep bottom part 32a and the shallow bottom part 32b.

The lid 4 includes a plate part 4a having an approximately rectangular shape in front view and elongated in a horizontal direction. In a lower part of the plate part 4a, an outward protrusion 4b is provided that protrudes in a direction departing from the water heating body 3. The inner surface of the outward protrusion 4b forms a horizontally elongated third recess 42. The first recess 32 and the third recess 42 forms the water evaporation chamber 5 elongated in a horizontal direction along the heat source 2a for evaporation.

As illustrated in FIGS. 4 and 6, one side part along a horizontal direction of the plate part 4a has an extending part 4c extending upward in a tapered shape. In the center part other than the periphery of the extending part 4c, an inward protrusion 43 is formed whose outer surface forms a circular recess and whose tip is opposite to one face of the extending part 3b. The water supply port 41 is provided in the center part of the inward protrusion 43. Then, the tip part of the water supply pipe 16 is fit and held in the water supply port 41. The peripheral edge part of the lid 4 is attached to the peripheral edge part of the water heating body 3 by using a plurality of male screws in an attachable and detachable manner.

The tip part of the water supply pipe 16 extends from the water supply port 41 toward the extending part 3b, and is located opposite to the one face of the extending part 3b with a small gap in between. Thus, the water supplied from the water supply pipe 16 to the water evaporation chamber 5 flows down along the one face of the extending part 3b.

The lower face of the third recess 42, that is, the lower face of the evaporation chamber 5, is inclined in such a manner that the leading opening 31 side is located higher and the water supply port 41 side is located lower. Thus, even when the supplied water flows down to the lower face of the evaporation chamber 5, the water is evaporated on the side departing from the leading opening 31.

The leading opening 31 goes through the upper part of the plate part 3a and has the shape of a horizontally elongated ellipse. Further, the delivery opening 31 is located at a position separated from the water supply port 41 in a horizontal direction and a vertical position of the leading opening 31 is approximately the same as the water supply port 41.

The steam generated in the water evaporation chamber 5 as described above flows through the leading opening 31 and then led to the buffer chamber 6. As illustrated in FIGS. 5 and 7, the buffer chamber 6 is formed by the other face of the plate part 3a including the second recess 33 and the annular wall 34. In the center part of the buffer chamber 6, a plate-shaped guide wall 37 is provided that is elongated in a horizontal direction and that guides the steam from the leading opening 31 toward a direction intersecting the direction of the plate part 3a thickness (the direction toward the other face of the plate part 3a). The guide wall 37 protrudes from the other face of the plate part 3a toward the heating chamber 11. The steam of the buffer chamber 6 flows along the guide wall 37 in zigzag directions for a long time. Thus, a large amount of heat is supplied from the heating chamber 11 to the steam. When the guide wall 37 is designed to be longer, an increased amount of heat is supplied to the steam.

The guide wall 37 is located between the heat sources 2a and 2b in the vertical direction. The heat source 2a is located between the upper face of the guide wall 37 and the annular wall 34. The heat source 2b is located between the lower face of the guide wall 37 and the annular wall 34. Further, the heat sources 2a and 2b extend along the guide wall 37 in a horizontal direction. Thus, in the course of travelling along the steam passage formed by the guide wall 37 and the annular wall 34, the steam of the buffer chamber 6 continuously receives heat from the heat sources 2a and 2b.

As illustrated in FIG. 5, an end part on the leading opening 31 side in the guide wall 37 is bent downward and in contact with the inner surface of the lower wall of the annular wall 34. A water stagnation part 3d is formed between the downward bent part of the annular wall 34 and the guide wall 37. In the end part on the side opposite to the delivery opening 31 in the guide wall 37, a protrusion 37a is provided that protrudes upward. The water stagnating on the upper face of the guide wall 37 becomes difficult to pass over the protrusion 37a, and hence easily flows down to the water stagnation part 3d.

A second temperature sensor 8 is provided in the water stagnation part 3d. The temperature sensor 8 includes an element (thermistor) whose electric resistance varies in accordance with a temperature change, and thereby monitors the water level in the water stagnation part 3d on the basis of the temperature change. When a given amount of water is stored in the water stagnation part 3d, the temperature sensor 8 performs ON action so as to conclude water overflow to the buffer chamber 6. Here, when the temperature sensor 8 has performed ON action, the control part controls the driving of the heater 2 and, for example, turns ON the heater 2.

The vertical sectional area of the passage between the guide wall 37 and the annular wall 34 (the area of the cross section perpendicular to the direction of steam flow) is larger than the area of the aperture of the leading opening 31. Thus, the pressure decreases in the steam led through the leading opening 31 into the buffer chamber 6. Accordingly, bumping becomes difficult to occur in the water stagnation part 3d.

In the buffer chamber 6, the part lower than the guide wall 37 faces the ejection openings 26. The steam ejected through the leading opening 31 in the direction of the plate part 3a thickness travels the upper part of the guide wall 37 toward the left direction in FIG. 3, then goes around the protrusion 37a so as to travel the lower part of the guide wall 37 toward the right direction, and then is ejected through the ejection openings 26 into the heating chamber 11.

The vertical sectional area of the passage between the guide wall 37 and the annular wall 34 is larger than the total area of the apertures of the plurality of ejection openings 26. Thus, the flow velocity of the steam increases in the vicinity of the ejection openings 26. Accordingly, the steam smoothly flows through the inside of the buffer chamber 6, and hence a pressure rise in the buffer chamber 6 is suppressed.

Further, in comparison with a case that the delivery opening 31 and the ejection openings 26 are located opposite to each other in the direction of ejection, the flow path of the steam flowing from the leading opening 31 to the ejection openings 26 is longer. Thus, in the course that the steam flows through the buffer chamber 6, the steam is heated with the heat of the heating chamber 11. Further, the steam is prevented from travelling straight from the leading opening 31 to the ejection openings 26.

As illustrated in FIG. 7, below the guide wall 37, a horizontally elongated groove-shaped recess 3e depressed deeper than the second recess 33 is formed in the other face of the plate part 3a. This causes an increase in volume of the buffer chamber 6. Thus, a larger amount of steam is stored in the buffer chamber 6 and hence the heating efficiency is improved.

In the right and left of the guide wall 37 in the buffer chamber 6, between the guide wall 37 and the low wall part of the annular wall 34, cylindrical heat radiating parts 3f protruding from the other face of the plate part 3a are provided integrally with the plate part 3a. Since the heat radiating parts 3f are provided, a larger area of contact of the steam with the water heating body 3 is obtained.

As illustrated in FIGS. 3 and 7, an annular sealing member 38 which is in contact with the right side face part 11a of the heating chamber 11 is mounted on the tip part of the annular wall 34. The sealing member 38 includes a frame-shaped close contact part 38a protruding inward from the annular wall 34 and extending along the annular wall 34. The dimension of the thickness of the base end part of the close contact part 38a is smaller than the dimension of the thickness of the protruding end of the close contact part 38a. Thus, the close contact part 38a is easily bent in a manner that the base end part serves as a fulcrum, and hence the close contact part 38a is pressed against the heating chamber 11 by the steam pressure.

Further, a sealing member 39 which is in contact with the right side face part 11a is mounted on the tip of the guide wall 37. The sealing member 39 prevents the steam from flowing through the part between the guide wall 37 and the right side face part 11a, and further prevents the steam from travelling straight from the leading opening 31 to the ejection openings 26 so as to cause the heat of the heating chamber 11 to be conducted enough to the steam stored in the buffer chamber 6.

When the steam generator A is attached to the right side face part 11a of the heating chamber 11, as illustrated in FIGS. 4 and 7, attachment shafts 27 and 27 are fit into the fitting holes 35a and 35a of the steam generator A and then nuts 28 and 28 are screwed to the tip parts of the attachment shafts 27 and 27. The steam generator A is easily positioned by the attachment shafts 27 and 27, and is attached to the right side face part 11a at an appropriate position relative to the ejection openings 26. Further, the sealing members 38 and 39 becomes in contact with the right side face part 11a and the buffer chamber 6 is closed by the right side face part 11a, so that a sealed chamber is formed. Furthermore, the heat in the heating chamber 11 is conducted through the right side face part 11a to the buffer chamber 6. That is, the steam in the buffer chamber 6 is reheated with the heat in the heating chamber 11. Further, the buffer chamber 6 is located between the heating chamber 11 and the water evaporation chamber 5, and hence the temperature in the buffer chamber 6 is maintained at a high temperature.

Here, the ejection openings 26 are vertically arranged in two rows in correspondence to the trays 60 and 60 vertically aligned. In a case that three or more trays 60 are contained in the heating chamber 11, three or more rows of ejection openings 26 are aligned in correspondence to the trays 60.

In the cooking device according to Embodiment 1, the steam having flowed obliquely upward through the water evaporation chamber 5 toward the leading opening 31 is led through the leading opening 31 into the buffer chamber 6. The led steam hits the right side face part 11a of the heating chamber 11 so that the direction of flow is changed and the steam is guided along the guide wall 37 in a horizontal direction. Further, the steam passes over the guide wall 37 and flows in the downward direction. Then, the steam reaches the part facing the ejection openings 26 in the lower part of the buffer chamber 6, and then is ejected through the plurality of ejection openings 26 into the heating chamber 10. The direction of flow of the steam moved into the buffer chamber 6 is changed as described here. Thus, even when a part of bumping water having spread in the water evaporation chamber 5 enters the buffer chamber 6 through the leading opening 31, the bumping water is more hardly ejected through the ejection openings 26. Further, the inside of the buffer chamber 6 is heated at a higher temperature than the water evaporation chamber 5 with the heat conducted from the right side face part 11a and the water heating body 3. Thus, even when a part of bumping water having spread in the water evaporation chamber 5 enters the buffer chamber 6 through the leading opening 31, the bumping water is reheated and evaporated. Accordingly, the bumping water is more hardly ejected through the ejection openings 26.

Further, even when a part of bumping water having spread in the water evaporation chamber 5 enters the buffer chamber 6 through the delivery opening 31, the bumping water having reached the guide wall 37 flows down from the guide start edge to the water stagnation part 3d along the guide wall 37 and then heated into steam in the inside of the water stagnation part 3d. The steam flows from the guide end edge of the guide wall 37 toward the ejection openings 26.

Further, the buffer chamber 6 is located adjacent to the heating chamber 11, and hence the heat of the heating chamber 11 is conducted to the buffer chamber 6. Thus, the steam generated in the water evaporation chamber 5 is reheated in the buffer chamber 6. This permits safe heating of the steam without causing an excessive rise in the temperature of the heater 2. Further, the power consumption in the steam reheating is suppressed. Furthermore, since the steam is ejected into the heating chamber 11 through the buffer chamber 6, the pressure of the steam is appropriately adjusted by appropriately changing the design of the buffer chamber 6.

Further, the buffer chamber 6 is located adjacent to the evaporation chamber 5. Thus, heat of the water evaporation chamber 5 is conducted to the buffer chamber 6. Thus, the heat for generating steam is utilized for reheating the steam. This improves the energy efficiency.

Further, the buffer chamber 6 is located between the evaporation chamber 5 and the heating chamber 11. Thus, the heat of the evaporation chamber 5 and the heating chamber 11 is conducted to the buffer chamber 6. Thus, the heat of both chambers is utilized for reheating the steam and hence the energy efficiency of steam reheating is improved remarkably. Further, since the buffer chamber 6 is located between both chambers, the temperature in the buffer chamber 6 is maintained at a high temperature.

Further, the heater 2 is located between the buffer chamber 6 and the water evaporation chamber 5. Thus, the heat of the heater 2 is supplied to both chambers. This improves thermal efficiencies of evaporation and of steam reheating. Further, size reduction of the steam generating container A is promoted.

Further, the heat sources 2a and 2b are aligned in the vertical direction, that is, in a direction intersecting the direction of ejection of the steam through the ejection openings 26. Then, the steam receives heat from the two heat sources 2a and 2b in the course from the leading opening 31 to the ejection openings 26, and hence the steam of the buffer chamber 6 is reliably reheated into a high temperature.

Further, the heat source 2b is located in the vicinity of the ejection openings 26. Thus, the temperature of the steam is raised in the vicinity of the ejection openings 26 and then the steam heated into a high temperature is immediately supplied to the heating chamber 11. Accordingly, the food 100 is allowed to be cooked immediately. Further, since the heat source 2b is arranged at a position distant from the evaporation chamber 5, the heat of the heat source 2b is conducted mainly to the buffer chamber 6 and hence the temperature of the buffer chamber 6 rises rapidly.

Further, in comparison with a case that the leading opening 31 and the ejection openings 26 are located opposite to each other in the direction of ejection, the flow path of the steam flowing from the leading opening 31 to the ejection openings 26 is longer. Thus, in the course that the steam flows through the buffer chamber 6, the steam is heated enough with the heat of the heating chamber 11. Further, this prevents the steam from travelling straight from the leading opening 31 to the ejection openings 26 so as to ensure steam reheating.

Further, the steam supplied through the delivery opening 31 located on the upper side fills the buffer chamber 6 and then is ejected through the ejection openings 26 located on the lower side. Thus, a large amount of steam is heated in the buffer chamber 6, and hence high temperature steam is supplied to the heating chamber 11 continuously.

Further, since the guide wall 37 is provided in the buffer chamber 6, the steam is guided from the delivery opening 31 to the ejection openings 26. When the guide wall 37 is designed to be long, the steam flows through the buffer chamber 6 for a long time and hence a large amount of heat is supplied from the heating chamber 11 to the steam.

Further, since the steam of the buffer chamber 6 flows in zigzag directions, the steam flows through the inside of the buffer chamber 6 for a long time and hence a large amount of heat is reliably supplied from the heating chamber 11 to the steam.

Further, since the heat sources 2a and 2b are provided on one face side or the other face side of the guide wall 37, the heat is conducted from the heat sources 2a and 2b to the steam along the flow path of the steam formed by the guide wall 37. Thus, in the course of travelling the flow path, the steam is heated efficiently.

Further, high temperature steam is ejected through the ejection openings 26 vertically aligned, onto the saucers 60 and 60 arranged in the heating chamber 11. Thus, the steam is allowed to be in contact with the food placed on the saucers 60 so that the food is cooked reliably.

Further, the recess 3e provided in the buffer chamber 6 causes an increase in the volume of the buffer chamber 6. Thus, a larger amount of steam is stored in the buffer chamber 6 and hence the heating efficiency is improved.

Further, the sealing member 38 (a sealing member such as a packing) is provided along the entire circumference of the annular wall 34 constituting the buffer chamber 6 storing the steam, and then the buffer chamber 6 is located immediately adjacent to the heating chamber 11 via the sealing member 38. Thus, at the time of fabricating the steam generating container A, the buffer chamber 6 forms an opened space. Accordingly, a cover having been necessary for forming a sealed space in the prior art is omitted, and hence the fabrication cost of the cooking device is reduced. Further, the annular wall 34 is arranged in close contact with the right side face part 11a of the heating chamber 11, and hence an approximately sealed space is formed by the steam generating container A and the heating chamber 11. Then, the heat of the heating chamber 11 is conducted to the space so that the steam in the space is heated. This permits reduction in the energy to be supplied to the heat source such as the heater provided in the steam generating container. That is, the steam is heated efficiently. Further, load to natural environment is reduced.

Further, the buffer chamber 6 forms an opened space. Thus, load to the design of a metal mold used for molding the steam generator A is minimized. Furthermore, at the time that the steam generating container A is attached to the heating chamber 11, the sealing member 38 reliably avoids leakage of the steam from the buffer chamber 6. Further, the heat of the heating chamber 11 is efficiently conducted to the steam stored in the buffer chamber 6. Further, since the heat generated in the heating chamber 11 is utilized, the steam heating does not require excessive heating of the heater 2. This permits reduction in the power consumption as well as safe heating of the steam.

Further, since the steam pressure of the buffer chamber 6 presses the close contact part 38a against the heating chamber 11, the sealing property of the sealing member 38 is improved.

Further, the thickness of the base end part (on the sealing member 38 side) of the close contact part 38a is smaller than the thickness on the protruding end side. Thus, the close contact part 38a is easily bent in a manner that the base end part serves as a fulcrum. Accordingly, the steam pressure of the buffer chamber 6 presses the close contact part 38a against the heating chamber 11, and hence reliably avoids the leakage of the steam from the buffer chamber 6.

In the cooking device according to Embodiment 1, the right side face part 11a of the heating chamber 11 serves also as a wall of the buffer chamber 6. Instead, a facing wall of the buffer chamber 6 may be provided that is located opposite to and in contact with the right side face part 11a. In this case, the heat of the heating chamber 11 is conducted through the right side face part 11a and the facing wall so that the steam in the buffer chamber 6 is heated.

Further, the guide wall 37 extends in a horizontal direction in the inside of the buffer chamber 6. Instead, the guide wall 37 may extend from the top face or the bottom face of the buffer chamber 6 toward a vertical direction.

Embodiment 2

Figure 9:
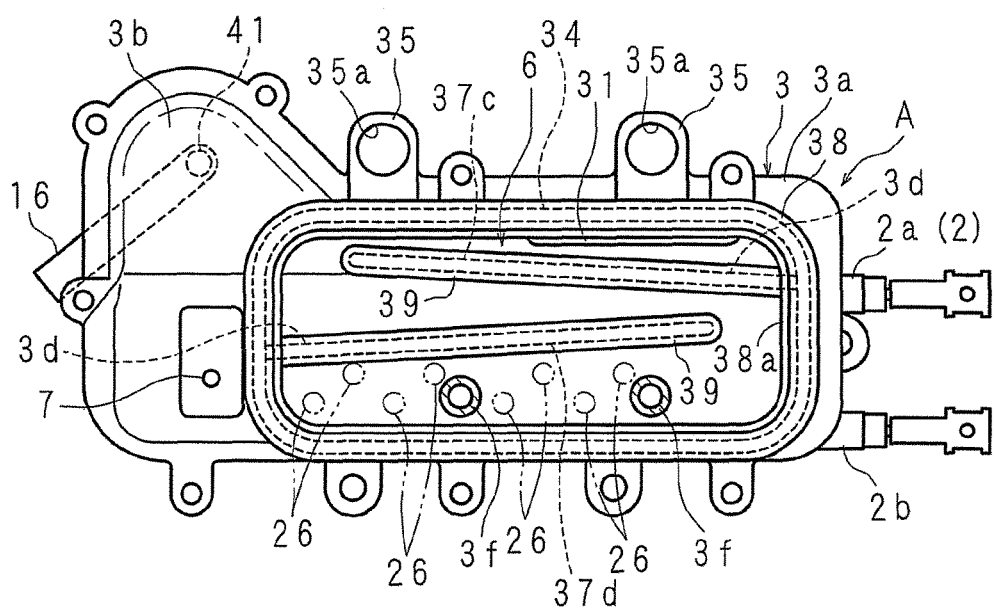
FIG. 9 is a schematic front view of a steam generator in a cooking device according to Embodiment 2.

The following description of the present invention is given in detail with reference to a drawing illustrating a cooking device according to Embodiment 2. FIG. 9 is a schematic front view of a steam generator in a cooking device according to Embodiment 2.

In this steam generator A, two guide walls 37c and 37d separated vertically and located opposite to each other are arranged such that the steam of the buffer chamber 6 should flow in zigzag directions.

The guide wall 37c on the upper side is inclined in an orientation that the leading opening 31 side is located lower, and then extends from one side of the buffer chamber 6 toward the other side. A space is provided between the extension end of the guide wall 37c and the other side of the buffer chamber 6.

The guide wall 37d on the lower side is inclined in an orientation that the leading opening 31 side is located upper, and then extends from the other side of the buffer chamber 6 toward the one side. A space is provided between the extension end of the guide wall 37d and the one side of the buffer chamber 6. Further, the guide wall 37d on the lower side is located above the ejection openings 26.

On the leading opening 31 side of the guide wall 37c, a water stagnation part 3d is formed in an upper part of the guide wall 37c. Further, on the side opposite to the leading opening 31 in the guide wall 37d, a water stagnation part 3d is formed in an upper part of the guide wall 37d.

In the configuration of the cooking device according to Embodiment 2, like components to Embodiment 1 are designated by like numerals and their detailed description is omitted.

Embodiment 3

Figure 10:
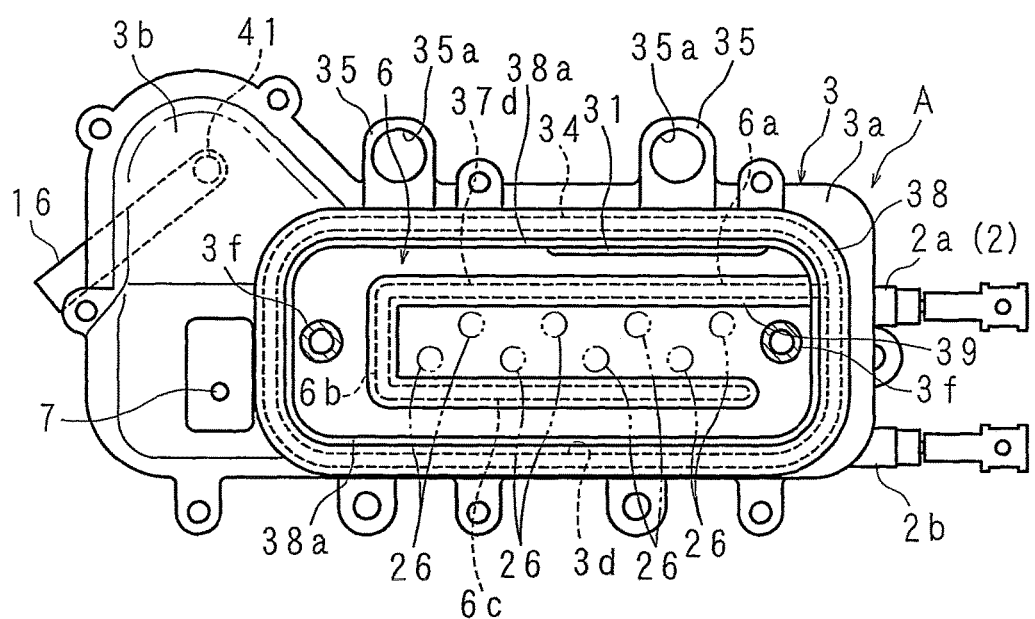
FIG. 10 is a schematic front view of a steam generator in a cooking device according to Embodiment 3.

The following description of the present invention is given in detail with reference to a drawing illustrating a cooking device according to Embodiment 3. FIG. 10 is a schematic front view of a steam generator in a cooking device according to Embodiment 3.

In this steam generator A, a guide wall 37d is provided such that the steam in the buffer chamber 6 should flow in a spiral manner and travel from the leading opening 31 to the ejection openings 26.

The guide wall 37d has a hook shape and includes: a base part 6a horizontally elongated from one side of the buffer chamber 6; a middle part 6b extending downward from the tip of the base part; and a tip part 6c extending from the bottom end of the middle part 6b toward the one side of the buffer chamber 6 in a manner of being opposite to the base part 6a. The base part 6a is located below the leading opening 31. The ejection openings 26 are located between the base part 6a and tip part 6c. Further, a water stagnation part 3d is formed in the lower face in the buffer chamber 6.

The steam in the buffer chamber 6 flows in a spiral manner from the leading opening 31 to the ejection openings 26, and hence the steam travels the inside of the buffer chamber for a long time. Thus, the heat in the heating chamber 11 is reliably conducted to the steam.

In the configuration of the cooking device according to Embodiment 3, like components to Embodiment 1 or 2 are designated by like numerals and their detailed description is omitted.

Embodiment 4

Figure 11:
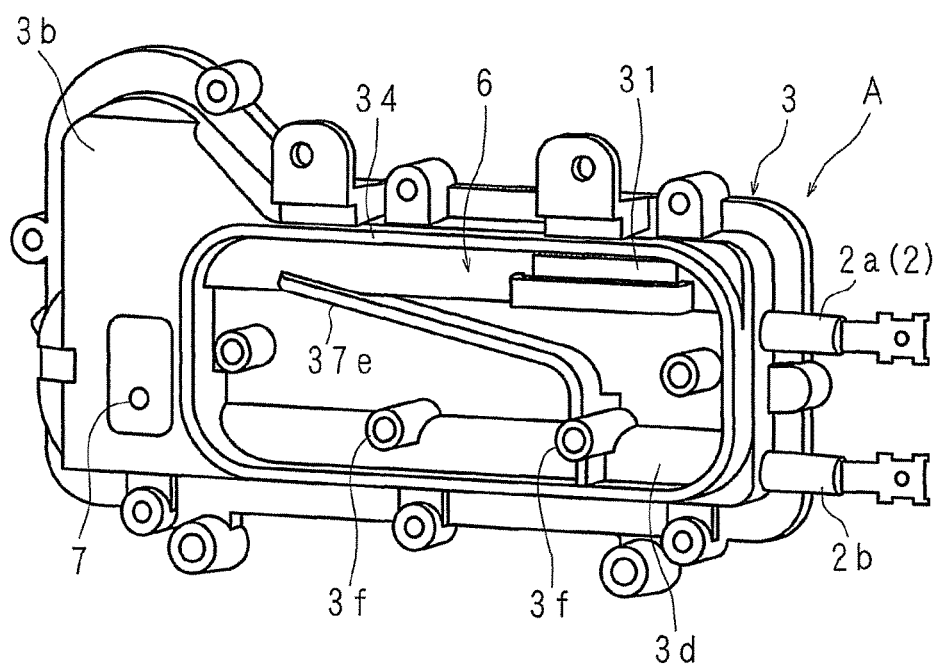
FIG. 11 is a schematic perspective view of a steam generator in a cooking device according to Embodiment 4.

The following description of the present invention is given in detail with reference to a drawing illustrating a cooking device according to Embodiment 4. FIG. 11 is a perspective view schematically illustrating a steam generator in the cooking device. In FIG. 11, description of the sealing members 38 and 39 is omitted.

This steam generator A includes a guide wall 37e inclined in an orientation that the leading opening 31 side is located lower. The leading opening 31 side part of the guide wall 37e is bent downward and in contact with the lower face of the buffer chamber 6. Then, a water stagnation part 3d is formed between the leading opening 31 side part of the guide wall 37e and the annular wall 34. Further, in a lower part of the leading opening 31 of the water heating body 3, a thermistor is provided for detecting the water level in the water stagnation part 3d.

In the cooking device according to Embodiment 4, even when a water drop adheres to the upper part of the guide wall 37, the adhering water drop moves in a direction departing from the ejection openings 26. Thus, the water drop is prevented from being ejected through the ejection openings 26.

In the configuration of the cooking device according to Embodiment 4, like components to Embodiments 1 to 3 are designated by like numerals and their detailed description is omitted.

Embodiment 5

Figure 12:
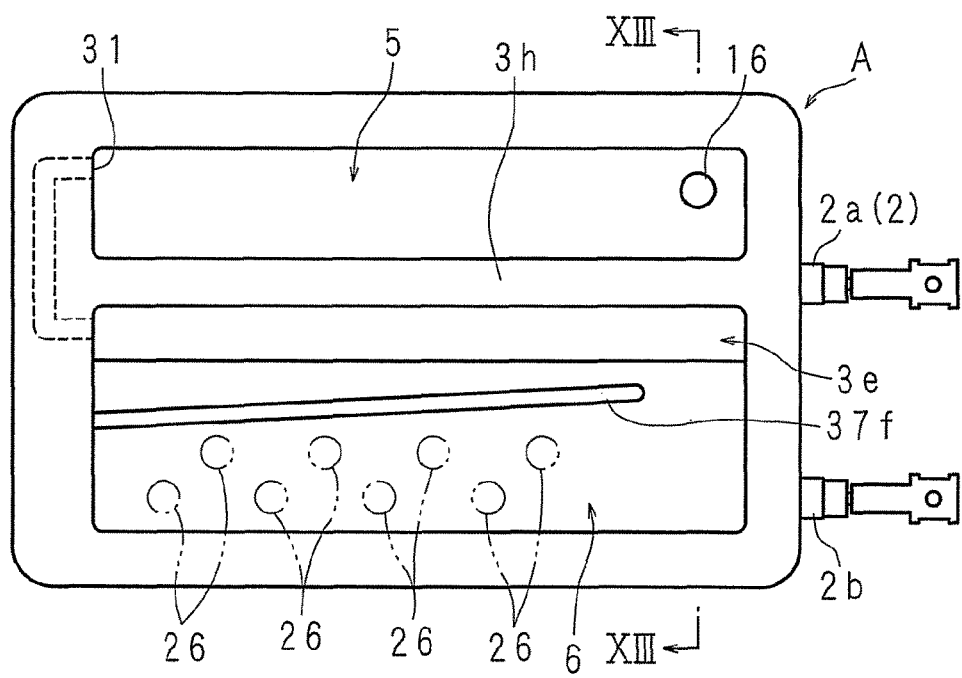
FIG. 12 is a schematic front view of a steam generator in a cooking device according to Embodiment 5.
Figure 13:
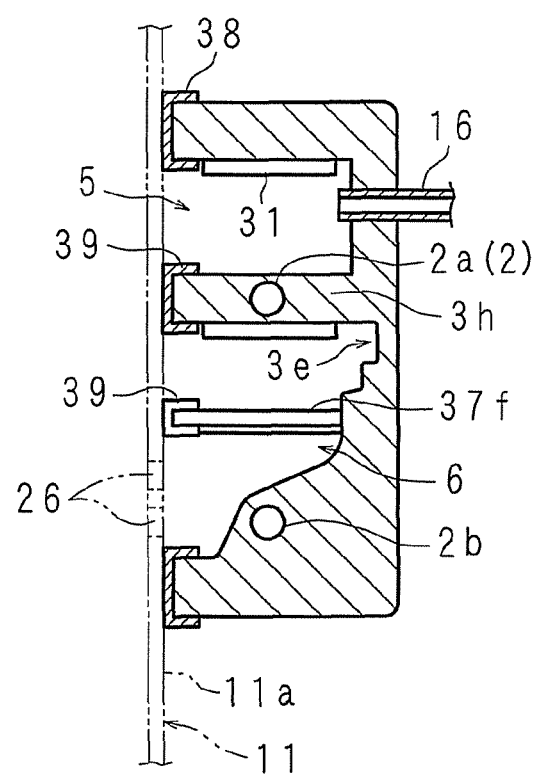
FIG. 13 is a sectional view taken along line XIII-XIII in FIG. 12.

The following description of the present invention is given in detail with reference to a drawing illustrating a cooking device according to Embodiment 5. FIG. 12 is a schematic front view of a steam generator in the cooking device. FIG. 13 is a sectional view taken along line XIII-XIII in FIG. 12.

This steam generator A includes a water evaporation chamber 5 and a buffer chamber 6 vertically aligned. The steam generator A has a container whose one face having a horizontally elongated rectangular shape is opened. Then, the opened one face side of the container is located opposite to the right side face part 11a of the heating chamber 11. In the inside of the container, a horizontally elongated separating wall 3h is provided for dividing the interior space vertically into two parts. The water evaporation chamber 5 is formed above the separating wall 3h, and the buffer chamber 6 is formed below the separating wall 3h.

A water supply pipe 16 is connected to the water evaporation chamber 5. Further, in the water evaporation chamber 5, a leading opening 31 connecting through the buffer chamber 6 is provided in a manner of being separated from the water supply pipe 16. In the buffer chamber 6, a guide wall 37f is provided that protrudes toward the right side face part 11a from the wall of the buffer chamber 6 located opposite to the right side face part 11a. The guide wall 37f extends horizontally from the leading opening 31 side, and is inclined in an orientation that the leading opening 31 side is located lower. Further, a recess 3e is provided in the wall of the buffer chamber 6 located opposite to the right side face part 11a.

A horizontally elongated heat source 2a is buried in the separating wall 3h. Further, a horizontally elongated heat source 2b is buried in the lower part of the buffer chamber 6. Here, the ejection openings 26 are located adjacent to the buffer chamber 6, and the heat source 2b is located in the vicinity of the ejection openings 26. Then, the heat of the heat source 2a is conducted to the water evaporation chamber 5 and the buffer chamber 6, and the heat of the heat source 2b is conducted to the buffer chamber 6. Further, the heat of the heating chamber 11 is conducted to the water evaporation chamber 5 and the buffer chamber 6.

In the cooking device according to Embodiment 5, the water evaporation chamber 5 is located adjacent to the heating chamber 11, and hence the heat of the heating chamber 11 is conducted to the water evaporation chamber 5. Thus, the heat of the heating chamber 11 is utilized for evaporation of water, and hence thermal efficiency of evaporation is improved. Further, load to the heater 2 supplying heat to the water evaporation chamber 5 is alleviated.

Here, in the cooking device according to Embodiment 5, the water evaporation chamber 5 is located at an upper position and the buffer chamber 6 is located at a lower position. However, the positions of the water evaporation chamber 5 and the buffer chamber 6 may be interchanged with each other.

In the configuration of the cooking device according to Embodiment 5, like components to Embodiments 1 to 4 are designated by like numerals and their detailed description is omitted.

Embodiment 6

Figure 14:
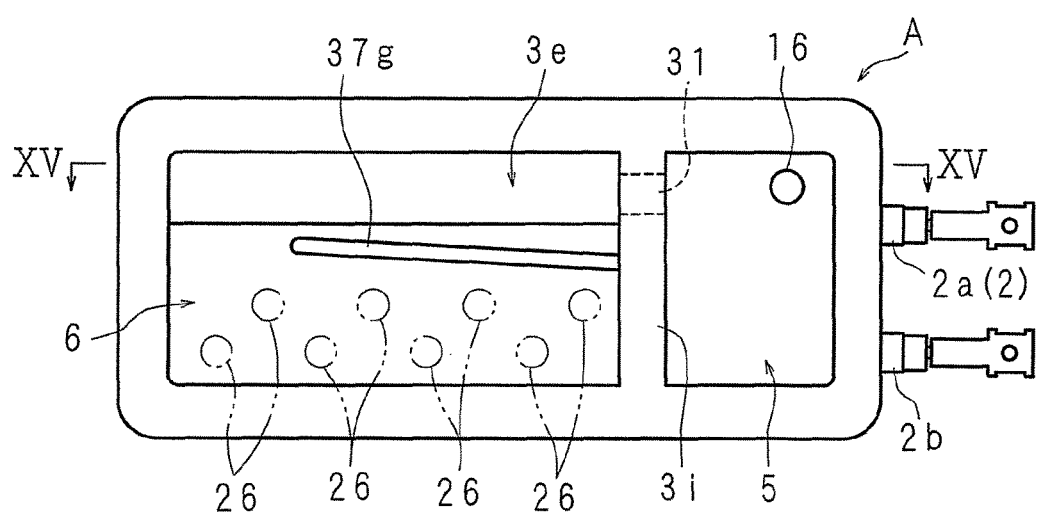
FIG. 14 is a schematic front view of a steam generator in a cooking device according to Embodiment 6.
Figure 15:
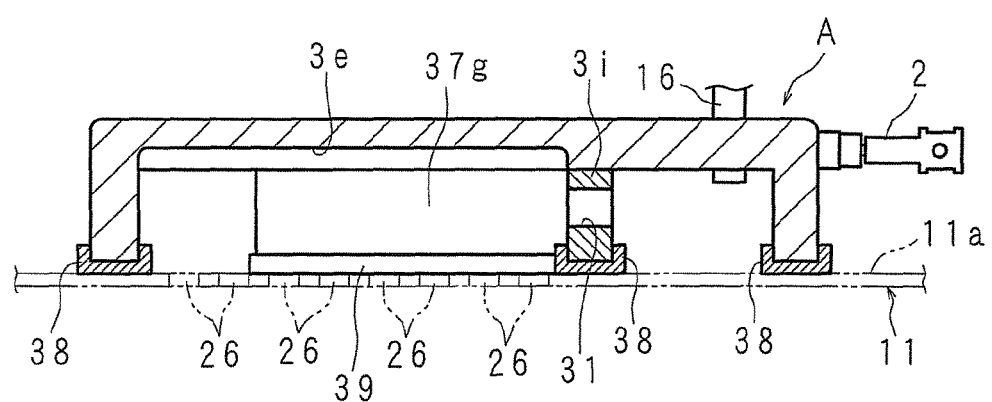
FIG. 15 is a sectional view taken along line XV-XV in FIG. 14.

The following description of the present invention is given in detail with reference to a drawing illustrating a cooking device according to Embodiment 6. FIG. 14 is a schematic front view of a steam generator in the cooking device. FIG. 15 is a sectional view taken along line XV-XV in FIG. 14.

This steam generator A includes a water evaporation chamber 5 and a buffer chamber 6 aligned right and left. The steam generator A has a container whose one face having a horizontally elongated rectangular shape is opened. Then, the opened one face side of the container is located opposite to the right side face part 11a of the heating chamber 11. In the inside of the container, a separating wall 3i extending vertically is provided for dividing the interior space into right and left parts. As illustrated in FIG. 14, the water evaporation chamber 5 is formed on the right side of the separating wall 3i, and the buffer chamber 6 is formed on the left side of the separating wall 3i.

A water supply pipe 16 is connected to an upper part of the wall located opposite to the right side face part 11a in the water evaporation chamber 5. Further, a leading opening 31 establishing fluid communication between the water evaporation chamber 5 and the buffer chamber 6 is provided in an upper part of the separating wall 3i in a manner of being separated from the water supply pipe 16. In the buffer chamber 6, a guide wall 37g is provided that protrudes toward the right side face part 11a from the wall of the buffer chamber 6 located opposite to the right side face part 11a. The guide wall 37g extends from right to left, and is inclined in an orientation that the right side is located lower. Further, a recess 3e is provided in the wall of the buffer chamber 6 located opposite to the right side face part 11a.

A U-shaped heater 2 is buried in the wall of the steam generator A located opposite to the right side face part 11a. The heater 2 includes heat sources 2a and 2b extending horizontally. The heat sources 2a and 2b are vertically aligned. In the water evaporation chamber 5, water supplied from the water supply pipe 16 flows along the wall, and heat is supplied from the heat sources 2a and 2b. Further, in the buffer chamber 6, heat is supplied from the heat sources 2a and 2b to the steam moved through the leading opening 31. The heat of the heat sources 2a and 2b is utilized for evaporation of water and reheating of steam.

Further, the heat of the heating chamber 11 is conducted to the water evaporation chamber 5 and the buffer chamber 6. Thus, the heat of the heating chamber 11 is utilized for evaporation of water, and hence thermal efficiency of evaporation is improved. Further, load to the heater 2 supplying heat to the water evaporation chamber 5 is alleviated.

Here, in the cooking device according to Embodiment 6, the water evaporation chamber 5 is located on the right side and the buffer chamber 6 is located on the left side. However, the positions of the water evaporation chamber 5 and the buffer chamber 6 may be interchanged with each other.

In the configuration of the cooking device according to Embodiment 6, like components to Embodiments 1 to 5 are designated by like numerals and their detailed description is omitted.

In the cooking device according to Embodiments 1 to 6, the water evaporation chamber 5 and the buffer chamber 6 are adjacent to each other. However, from the perspective of heating the steam with the heat of the heating chamber 11, the two chambers need not be adjacent to each other. For example, the water evaporation chamber 5 may be located at a position departing from the buffer chamber 6, and then the water evaporation chamber 5 and the buffer chamber 6 may be brought into fluid communication with each other through an air passage such as a tube. Even in this case, the steam led from the water evaporation chamber 5 through the air passage into the buffer chamber 6 is heated safely and efficiently with the heat conducted from the heating chamber 11 located adjacent to the buffer chamber 6.

The embodiments of the present invention given above are illustrative. Thus, the present invention may be implemented in various modes obtained by modification within the scope set forth by the description of the claims.

DESCRIPTION OF REFERENCE NUMERALS 1 housing
2 heater
2a, 2b heat source
3 water heating body
3e recess
5 water evaporation chamber
6 buffer chamber
11 heating chamber
16 water supply pipe (water supply means)
26 ejection opening
31 leading opening
37 guide wall
60 tray (saucer)
A steam generating container

The invention claimed is:

1. A cooking device comprising:
a heating chamber in which food is put and heated;
a steam generator which supplies steam to the heating chamber;
a water supply device supplying water to the steam generator;
wherein the steam generator comprises:
a water evaporation chamber which evaporates water supplied from the water supply device;
a buffer chamber adjoining the water evaporation chamber which accumulates steam generated in the water evaporation chamber; and
a steam passage formed in the buffer chamber through which the steam flows,
the buffer chamber is sandwiched between and in direct contact with both the heating chamber and the water evaporation chamber such that the buffer chamber is heated by conduction from the water evaporation chamber and the heating chamber,
a single leading opening for leading steam generated in the water evaporation chamber to the steam passage is provided in an upper part of the water evaporation chamber,
the steam passage being formed by a guide wall provided in the buffer chamber and protruding from an inner wall of the buffer chamber, the guide wall structured and arranged to guide the steam from the single leading opening toward the heating chamber.

2. The cooking device according to claim 1, wherein the cooking device has a heat source which supplies heat to both the steam passage and the water evaporation chamber.

3. The cooking device according to claim 2, wherein the heat source is arranged between the buffer chamber and the water evaporation chamber.

4. The cooking device according to claim 3, wherein the heat source is buried in a boundary part between the buffer chamber and the water evaporation chamber.

5. The cooking device according to claim 4, comprising:
a plurality of the heat sources, wherein
the plurality of the heat sources includes:
a first heat source located close to the water evaporation chamber; and a second heat source located away from the water evaporation chamber.

6. The cooking device according to claim 1, wherein the buffer chamber adjoins the heating chamber.

* * * * *